No. 898,306. PATENTED SEPT. 8, 1908.
J. G. BODENSTEIN.
ICE CUTTING TOOL.
APPLICATION FILED JAN. 14, 1908.
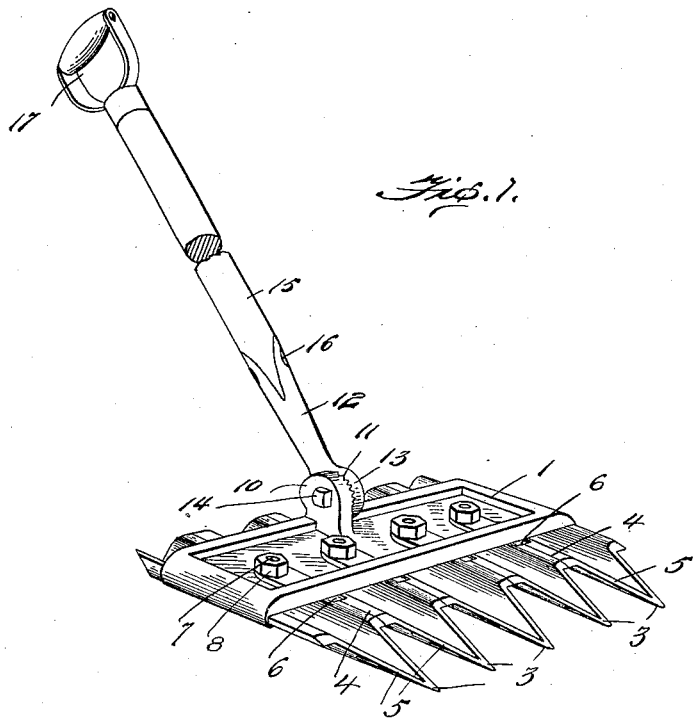
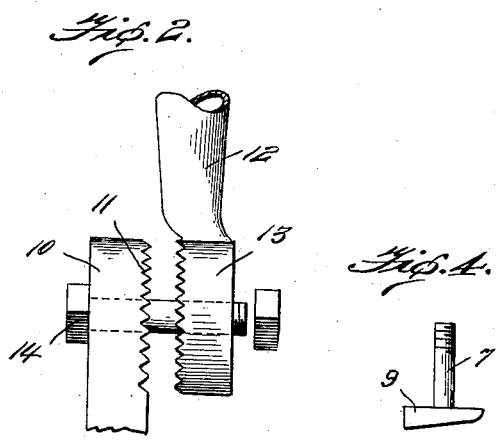
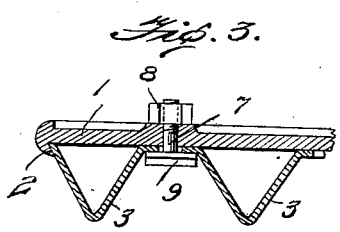
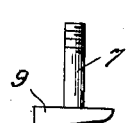
WITNESSES:
John G. Bodenstein,
INVENTOR.
BY
ATTORNEY.
THE NORRIS PETERS CO., WASHINGTON, D. C.

UNITED STATES PATENT OFFICE.

JOHN GEORGE BODENSTEIN, OF STAATSBURG, NEW YORK.

ICE-CUTTING TOOL.

No. 898,306.  Specification of Letters Patent.  Patented Sept. 8, 1908.

Application filed January 14, 1908. Serial No. 410,789.

*To all whom it may concern:*

Be it known that I, JOHN G. BODENSTEIN, a citizen of the United States, residing at Staatsburg, in the county of Dutchess and State of New York, have invented certain new and useful Improvements in Ice-Cutting Tools, of which the following is a specification.

My invention relates to improvements in ice cutting tools, and has for its object the provision of a simple, strong and inexpensive planer or cutter for leveling the ice floors in ice houses and ice fields.

Another object of my invention is the provision of a device of the character set forth which may be operated by hand with ease and efficiency and which may be operated with great rapidity so as to accomplish a maximum amount of work.

Another object of the invention is to provide a planer or cutting tool which is adjustable to suit different conditions and requirements, and one which will be practical in all respects.

With the above and other objects in view, my invention consists of a hand tool embodying a knife bar, knives adjustably secured thereto, a handle to the tool, and adjustable connection between the handle and tool.

My invention further comprises an ice tool embodying certain other novel features of construction, combination and arrangement of parts substantially as disclosed herein and as illustrated in the accompanying drawings, in which:

Figure 1, is a perspective view of my improved ice cutter as in actual use. Fig. 2, is a broken detail view of the adjustable handle connection. Fig. 3, is a broken sectional view showing the manner in which the knives are adjustably secured to the knife bar. Fig. 4 is a detail view of one of the bolts 7.

The surface of the ice in ice storage houses and the surface of the ice field frequently becomes lumpy and hummocky owing to different causes, and my invention is particularly adapted as a hand tool for removing these lumps and irregularities in the surface of the ice and render the ice floor smooth and level. The tool comprises the knife bar or plate 1, to the under face of which the knives are secured. This bar has a flat under face and the ends of the bar are turned under and directed inwardly to provide inclined jaws 2, for grasping and holding the outermost of the series of knives.

The knives 3, consist of trough-shaped members (which are V-shaped in cross section), having angularly directed flanged abutting edges 4, and the forward downwardly inclined cutting edges 5. The flanged abutting edges of the knives are cut away or recessed for a portion of their length between the ends as at 6, so that when the knives are placed edge to edge, an oblong opening is provided between the meeting edges. Bolts 7, are passed up through the openings thus provided between the knives, through the knife bar, and securing nuts 8, are mounted upon the upper ends of the bolts. The bolts have squared heads 9, on their lower ends to engage the flanged edges of the adjoining knives, and the lower face of the bolt heads taper in a forwardly direction as shown so as not to cause the chipped ice to clog in front of the bolt heads. The outer edges of the outermost knives are held clamped by the inturned jaws on the knife bar. In this manner, the knives are adjustably secured to the supporting bar and any one or all of the knives may be removed and replaced at will.

In order that the tool may be conveniently handled by persons of different height and so that the angle of the knives may be adjusted at will, it is desirable to provide an adjustable handle for the tool. To accomplish this, an upstanding lug 10, is provided on the knife bar one face of which is corrugated radially as at 11. A handle socket 12, is formed with a head 13 at its forward end which is corrugated to correspond to the corrugations on the connecting lug of the knife bar. A bolt 14, passed through the head of the socket member and the connecting lug serves to adjustably secure the members together. A handle staff or rod 15, is secured in the socket by means of the cross bolt 16, and a D-handle 17, may be mounted on the outer end of the shaft. An adjustable handle is of course preferable, but if so desired, the handle socket may be formed integral with the knife bar. The implement may be pushed or pulled as desired and will plane the ice in a thorough and efficient manner.

From the foregoing description taken in connection with the drawings, it will be apparent that I have produced an ice tool which fully and satisfactorily accomplishes all the objects herein aimed at, and which is desirable and useful.

I claim:

An ice leveling tool comprising a knife bar having angularly inturned ends, a series of knives having flanged abutting edges, the said edges being recessed for a portion of their length, fastening bolts being passed up through the knife bar between such recessed edges, the bolts having squared heads engaging the flanged edges of the knives to hold them in place and said heads being tapered in thickness in a forward direction, the outermost knives having inclined sides to be engaged and held by the inwardly inclined ends of the knife bar, and a handle attached to the knife bar.

In testimony whereof I affix my signature, in presence of witnesses.

JOHN GEORGE BODENSTEIN.

Witnesses:
WILLARD T. CARL,
Mrs. JOHN BODENSTEIN,
GRACE BODENSTEIN.